United States Patent
Kacker et al.

(10) Patent No.: US 10,591,979 B2
(45) Date of Patent: Mar. 17, 2020

(54) BATTERY MANAGEMENT IN A DEVICE WITH MULTIPLE BATTERIES

(71) Applicant: Microsoft Technology Licensing, LLC, Redmond, WA (US)

(72) Inventors: Karan Kacker, Seattle, WA (US); Daniel Joseph Dummer, Seattle, WA (US); Wei Guo, Sammamish, WA (US); Stephen Clifford Cooper, Seattle, WA (US); Ceceli Ann Wilhelmi, Sammamish, WA (US); Minsoo Kim, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 14/678,144

(22) Filed: Apr. 3, 2015

(65) Prior Publication Data
US 2016/0291683 A1    Oct. 6, 2016

(51) Int. Cl.
*H02J 7/00* (2006.01)
*G06F 1/3287* (2019.01)
(Continued)

(52) U.S. Cl.
CPC ............ *G06F 1/3287* (2013.01); *G06F 1/263* (2013.01); *G06F 1/3212* (2013.01);
(Continued)

(58) Field of Classification Search
CPC .......... H02J 7/0014; H02J 7/0018; H02J 3/32; H02J 2007/0067; H02J 2007/0095
(Continued)

(56) References Cited

U.S. PATENT DOCUMENTS

| 5,666,006 A | 9/1997 | Townsley et al. |
| 5,920,179 A | 7/1999 | Pedicini |

(Continued)

FOREIGN PATENT DOCUMENTS

| CN | 104092257 A | 10/2014 |
| CN | 104333059 A | 2/2015 |

(Continued)

OTHER PUBLICATIONS

"International Search Report and Written Opinion", Application No. PCT/US2016/024603, dated Sep. 16, 2016, 22 pages.

(Continued)

*Primary Examiner* — David V Henze-Gongola
(74) *Attorney, Agent, or Firm* — Rainier Patents, P.S.

(57) ABSTRACT

Techniques for battery management of a device having multiple batteries are described herein. In one or more implementations, management for increased battery reliability involves assessing a combination of factors that influence a control policy for multiple batteries in a battery system. Based on the assessment, values of control parameters for power management of the battery system are set to reflect a tradeoff between performance and reliability. Then, at least one of battery utilization or charge current distribution is controlled in dependence upon the values that are set. Control of the battery system can be based in part upon differences in cycle counts for multiple batteries of a battery system for a device, such that cycle counts of the multiple batteries are managed for improved reliability.

20 Claims, 8 Drawing Sheets

(51) Int. Cl.
*G06F 1/26* (2006.01)
*G06F 11/30* (2006.01)
*H01M 10/42* (2006.01)
*G06F 1/3212* (2019.01)
*H01M 10/44* (2006.01)

(52) U.S. Cl.
CPC ..... *G06F 11/3062* (2013.01); *H01M 10/4207* (2013.01); *H01M 10/441* (2013.01); *H02J 7/0003* (2013.01); *H02J 7/0013* (2013.01); *H02J 7/0016* (2013.01); *H02J 7/0021* (2013.01); *H02J 7/0063* (2013.01); *H02J 7/0068* (2013.01); *H02J 2007/0067* (2013.01)

(58) Field of Classification Search
USPC .......................................................... 320/135
See application file for complete search history.

(56) References Cited

U.S. PATENT DOCUMENTS

| | | | |
|---|---|---|---|
| 5,964,879 A * | 10/1999 | Dunstan | G06F 1/3215 713/320 |
| 6,307,349 B1 | 10/2001 | Koenck et al. | |
| 6,346,794 B1 | 2/2002 | Odaohhara | |
| 6,452,362 B1 | 9/2002 | Choo | |
| 7,282,814 B2 | 10/2007 | Jacobs | |
| 7,489,106 B1 * | 2/2009 | Tikhonov | H02J 7/0018 320/116 |
| 7,683,576 B2 | 3/2010 | Tien et al. | |
| 7,751,994 B2 | 7/2010 | Matsumura et al. | |
| 7,911,179 B2 | 3/2011 | Nakanishi | |
| 8,255,176 B2 | 8/2012 | Plestid | |
| 2005/0116686 A1 * | 6/2005 | Odaohhara | H01M 10/4207 320/116 |
| 2010/0176763 A1 | 7/2010 | Yen | |
| 2011/0267007 A1 | 11/2011 | Chen et al. | |
| 2012/0133333 A1 * | 5/2012 | Morioka | H01M 10/441 320/134 |
| 2012/0293003 A1 * | 11/2012 | Shimamura | H01M 10/052 307/77 |
| 2013/0260188 A1 | 10/2013 | Coates | |
| 2013/0320919 A1 | 12/2013 | Adames | |
| 2014/0015469 A1 * | 1/2014 | Beaston | H02J 3/32 320/101 |
| 2014/0101476 A1 | 4/2014 | Lu et al. | |
| 2014/0129163 A1 | 5/2014 | Betzner | |
| 2014/0167699 A1 * | 6/2014 | Yebka | H02J 7/0063 320/130 |
| 2014/0210265 A1 * | 7/2014 | Thorsoe | H02J 7/0011 307/23 |
| 2016/0105044 A1 * | 4/2016 | Yamaguchi | H02J 7/0016 320/112 |

FOREIGN PATENT DOCUMENTS

| | | |
|---|---|---|
| EP | 2099112 | 9/2009 |
| EP | 2712045 | 3/2014 |
| WO | WO-2013134438 | 9/2013 |

OTHER PUBLICATIONS

"PC 99 System Design Guide", A Technical Reference for Designing PC's and Peripherals for the Microsoft Windows Family of Operating Systems, Jan. 1, 1998, 513 pages.
Badam,"Software Defined Batteries", Symposium on Operating Systems Principles (SOSP'15), Oct. 4, 2015, 15 pages.
Flinn,"Managing Battery Lifetime with Energy-Aware Adaptation", In Journal of ACM Transactions on Computer Systems, vol. 22, Issue 2, May 2004, 43 pages.
Wagner,"Microsoft Planning 7-Day Phone Batteries", http://www.lightreading.com/mobile/devices-smartphones/microsoft-planning-7-day-phone-batteries/d/d-id/709382?print=yes, Jun. 10, 2014, 2 pages.
Chang, "The State of Charge Estimating Methods for Battery: A Review", In Proceeding of the ISRN Applied Mathematics, May 12, 2013, 8 pages.
Gordon, "Avoid Frequent Discharges to Extend Your Phone or Laptop's Battery Life", Retrieved From: <http://lifehacker.com/5789794/avoid-frequent-discharges-to-extend-your-phone-or-laptops-battery-life> Jan. 16, 2015, Apr. 7, 2011, 5 pages.
Gurries, "Dual Battery Power Manager Increases Run Time by 12% and Cuts Charge Time in Half", Available at: <http://cds.linear.com/docs/en/design-note/dn277f.pdf>, May 14, 2013, 2 pages.
"Second Written Opinion", Application No. PCT/US2016/024603, dated Mar. 14, 2017, 11 pages.
"First Office Action and Search Report Issued in Chinese Patent Application No. 201680020821.9", dated Mar. 18, 2019, 17 Pages.

* cited by examiner

BATTERY MANAGEMENT IN A DEVICE WITH MULTIPLE BATTERIES

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. One challenge that faces developers of mobile computing devices is efficient power management and extension of battery life. For example, extended processing of tasks by processors at or near capacity may drain the device battery and create thermal conditions that may force shutdown of the device. Various power management strategies may be applied to control processor and battery utilization generally at the expense of overall device performance. If power management implemented for a device fails to strike a good balance between performance and battery life, user dissatisfaction with the device and manufacturer may result.

SUMMARY

Techniques for battery management of a device having multiple batteries are described herein. In one or more implementations, management for increased battery reliability involves assessing a combination of factors that influence a control policy for multiple batteries in a battery system. Based on the assessment, values of control parameters for power management of the battery system are set to reflect a tradeoff between performance and reliability of the battery system as indicated by the combination of factors. Then, at least one of battery utilization or charge current distribution is controlled for the battery system in dependence upon the values that are set for the control parameters. In one approach, a discharge parameter is defined for the battery system to cause servicing of a system load for the computing device by: first discharging one battery down to a charge level specified by the discharge parameter and then using one or more of the multiple batteries at a time in combination to service the load. Additionally, control of the battery system, including setting of the discharge parameter and other control operations, can be based in part upon differences in cycle counts for multiple batteries of a battery system for a device, such that cycle counts of the multiple batteries are managed for improved reliability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
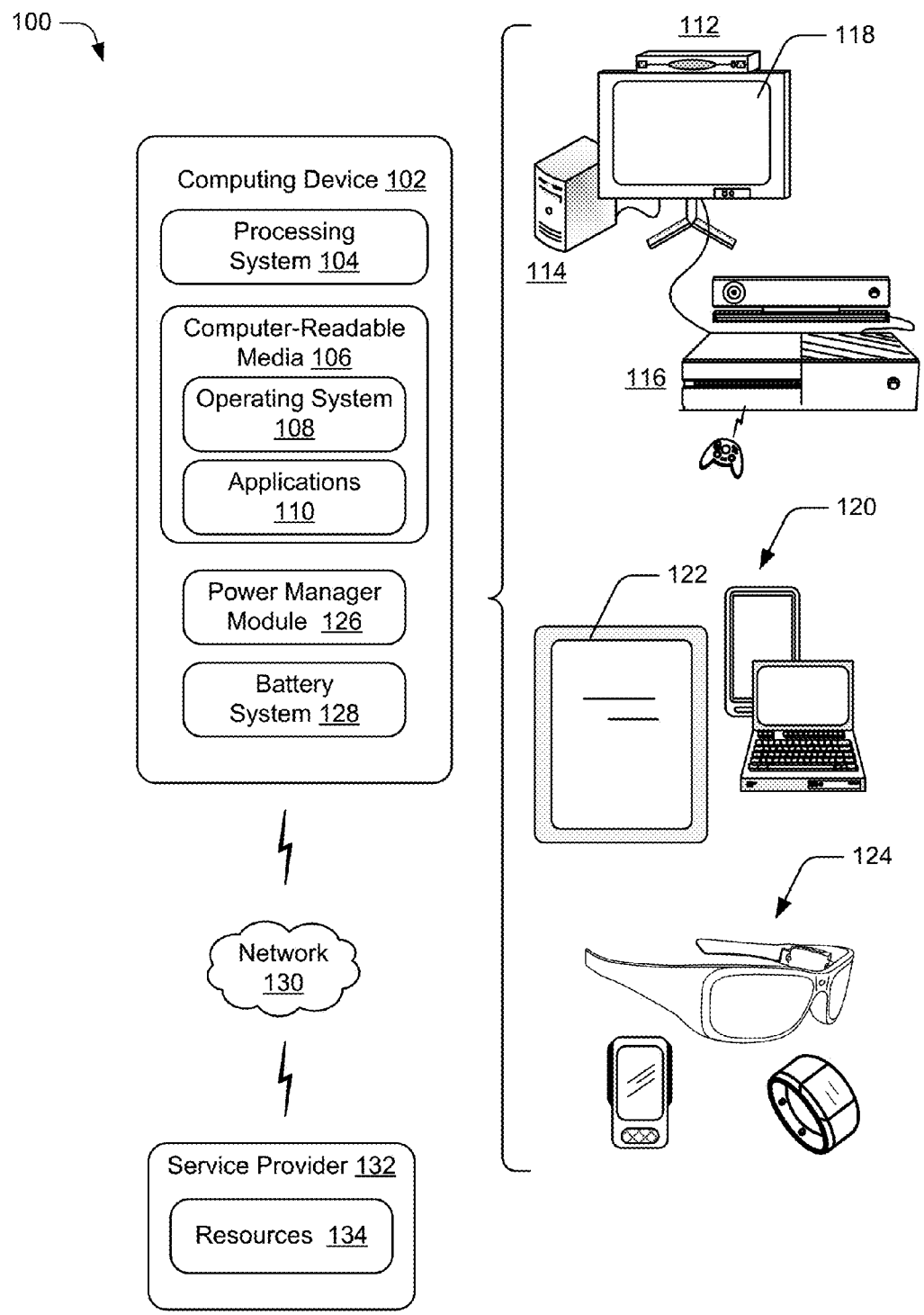
FIG. 1 illustrates an example operating environment in accordance with one or more implementations.

Various power management strategies may be applied to control processor and battery utilization of a device generally at the expense of overall device performance. If power management implemented for a device fails to strike a good balance between performance and battery life, user dissatisfaction with the device and manufacturer may result.

Techniques for battery management of a device having multiple batteries are described herein. In one or more implementations, management for increased battery reliability involves assessing a combination of factors that influence a control policy for multiple batteries in a battery system. Based on the assessment, values of control parameters for power management of the battery system are set to reflect a tradeoff between performance and reliability of the battery system as indicated by the combination of factors. Then, at least one of battery utilization or charge current distribution is controlled for the battery system in dependence upon the values that are set for the control parameters. In one approach, a discharge parameter is defined for the battery system to cause servicing of a system load for the computing device by: first discharging one battery down to a charge level specified by the discharge parameter and then using the multiple batteries in combination, using a different one of the batteries, and/or switching back and forth between multiple batteries to service the load. Additionally, control of the battery system, including setting of the discharge parameter and other control operations, can be based in part upon differences in cycle counts for multiple batteries of a battery system for a device, such that cycle counts of the multiple batteries are managed for improved reliability.

The techniques described herein provide an intelligent control system for management of multiple battery cells of the device. A power controller as described in this document is adapted to implement control policies that account for a variety of factors from more sources than a traditional power controller, including but not limited to a level of charging current available, the state of charge of each of the cells, differences in charge cycles, support of user scenarios, current and anticipated load conditions, user preferences and directives, application requests, and so forth. Thus, different policies may be applied in different circumstances. The techniques enable balancing of charge cycles between batteries, which increases reliability and longevity for the battery system. The techniques additionally allow the operating system, applications, and/or users to adjust control parameters to achieve different tradeoffs between performance and reliability to support a range of different usage scenarios, tailor control to different contexts, ensure sufficient power is available, and manage the system for reliability in appropriate circumstances.

In the discussion that follows, a section titled "Operating Environment" is provided and describes one example environment in which one or more implementations can be employed. Following this, a section titled "Multiple Battery Management Details" describes example details and procedures in accordance with one or more implementations. Last, a section titled "Example System" describes example computing systems, components, and devices that can be utilized for one or more implementations of heterogeneous battery cell charging.

Operating Environment

FIG. 1 illustrates an operating environment in accordance with one or more implementations, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Further the computing device 102 may represent an on-board computer of a vehicle, such as an electric car that has a chargeable battery system. Any of the computing devices can be implemented with various components, such as one or more processors and memory devices, as well as with any combination of differing components. One example of a computing system that can represent various systems and/or devices including the computing device 102 is shown and described below in relation to FIG. 8.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 8.

The computing device 102 may also include a power manager module 126 and a battery system 128 that operate as described above and below. The battery system 128 is configured to include multiple batteries as discussed in greater detail below. The power manager module 126 and battery system 128 may be provided using any suitable combination of hardware, software, firmware, and/or logic devices. As illustrated, the power manager module 126 and battery system 128 may be configured as separate, stand-alone modules. In addition or alternatively, the power manager module 126 may also be configured as a module that is combined with the operating system 108 or implemented via a controller or other component of the battery system 128.

The power manager module 126 represents functionality operable to assess system-wide power management considerations and manage the battery system 128, processors, and/or processing cores based on the assessment. In one or more implementations, the power manager module 126 may be configured to implement control policies established based on power management considerations to control the battery system 128. This may involve analyzing factors including but not limited to a level of charging current available, the state of charge of each of the cells, differences in charge cycles, support of user scenarios, current and anticipated load conditions, user preferences and directives, application requests, battery characteristics, thermal conditions, priority settings, and so forth. The power manager module 126 may be configured to apply different policies that are mapped to different combinations of the factors such that management of multiple batteries is dynamically tailored to different contexts. Applying a control policy may involve communicating control signals or directives to direct operation of a power controller to implement a particular policy that is selected based on analysis of the factors. Details regarding these and other aspects are discussed in the following section.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations.

Multiple Battery Management Details

To further illustrate, consider the discussion in this section of example devices, components, procedures, and implementation details that may be utilized to provide battery management for multiple batteries as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
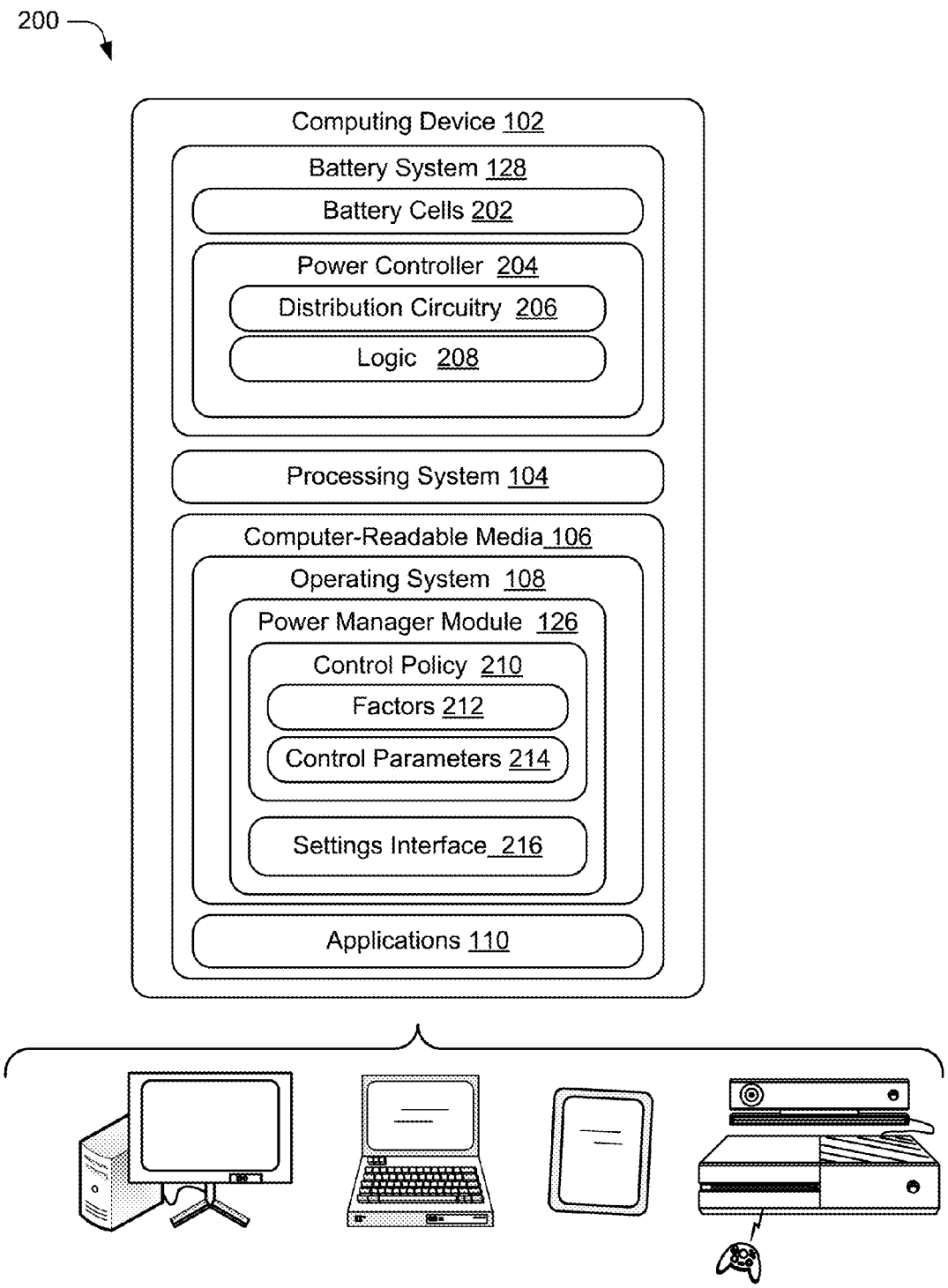
FIG. 2 is diagram depicting example details of a computing device having a battery system with multiple battery cells in accordance with one or more implementations.

FIG. 2 depicts generally at 200 example details of a computing device 102 having a battery system 128 with multiple batteries (e.g. battery cells) in accordance with one or more implementations. Computing device 102 also includes processing system 104, computer readable media 106, operating system 108 and applications 110 as discussed in relation to FIG. 1. In the depicted example, a power manager module 126 is also shown as being implemented as a component of the operating system 108.

By way of example and not limitation, the battery system 128 is depicted as having battery cells 202 and a power controller 204. The battery cells 202 are representative of various different kinds of cells that may be included with the computing device. Battery cells 202 may include multiple batteries of the same type as well as include batteries having different characteristics such as different sizes/capacities, cycle counts, chemistries, battery technologies, shapes, state of charge (SOC), charge rates, discharge rates, impedance, and so forth. Accordingly, the battery system 128 includes a diverse combination of multiple battery cells at least some of which may have different characteristics one to another. Various combinations of battery cells 202 may be utilized to provide a range of capacities, performance capabilities, efficiencies, and power usage characteristics that may be mapped to different end usage scenarios.

The power controller 204 is representative of a portion of a control system to control the battery cells 202 in a variety of ways. The power controller 204 may be configured using various logic, hardware, circuitry, firmware, and/or software suitable to connect the battery cells 202 one to another, supply power for charging of the cells, control power paths established between the battery cells, service a load using one or more batteries, and so forth. Thus, the power controller 204 may be implemented to provide various functionality related to management of both charging of the battery cells and delivery of power from the battery cells to service a system load. In one or more implementations, a dialog or other suitable interface can be exposed to enable user control over settings associated with the power controller to adjust system performance and customize battery management.

By way of example and not limitation, the power controller 204 in FIG. 2 is depicted as including distribution circuitry 206 and logic 208 operable to implement aspects of the techniques described herein. In particular, the distribution circuitry 206 represents circuit lines, switches, electronic devices, and/or other hardware components provided to interconnect the battery cells, route charging current from a power source to the battery cells, and selectively connect different batteries at different times to service as system load. In one or more implementations, the distribution circuitry 206 is configured to connect each of the battery cells directly to the power controller to provide individual power paths to and from each of the battery cells. In other words, distribution circuitry 206 provides switching mechanisms to distribute current to the cells for charging of the cells and distribute power from the cells via the individual current paths to service the load. One example, arrangement of circuitry suitable to implement techniques described herein is shown and described below in relation to FIG. 4.

The logic 208 represents fixed logic circuitry, firmware, and/or other hardware based logic of the controller that may be configured to control the distribution circuitry 206 for charging and discharging. The logic 208 may include functionality for distribution of charging current to the cells, migration of charge between cells, and selective connection of one or more cells at a time to service a load. The logic 206 may reference control parameter values to operate the distribution circuitry 206 in a manner that is implements a corresponding charging strategy.

In one approach, management of battery cells occurs under the influence of the power manager module 126. In particular, the power manager module 126 can be configured with a control policy 210 or policies that specify schemes and operations for management of the battery system. The control policy 210 is generated and adapted in dependence upon analysis of a plurality of factors 212. An assessment of the factors is used to set and update values for control parameters 214 that determine how batteries are charged, discharged, and otherwise managed in accordance with the control policy 210. Recognition of a particular combination of the factors based upon the assessment enables the power manager module 126 to choose or adapt the policy to support different usage scenarios.

The power manager module 126 is further operable to send control directives to direct the power controller 204 to implement the policy. Through the directives, the power controller 204 may receive indications of values for control parameters 214 that are set through interaction with the power manager module 126. The power controller 204 can store the values via registers or other suitable storage associated with the power controller. The logic 208 of the controller operates to look-up and utilize the control parameter values to implement a policy that can be dynamically adapted to support different scenarios by making corresponding changes to the control parameter values.

For instance, the power manager module 126 provides functionality to facilitate management of the charging policy 212, selection from different available policies, adjustment of control parameters to configure a policy, creation of custom policies, and so forth. The power manager module 126 may provide a settings interface 216 in the form of a dialog, application programming interface (API), user interface, and/or other suitable instrumentality to enable access to the charging policy, modifications to pre-defined policies, creation of custom contexts and strategies, designation of user preferences, and other situational customizations. The settings interface 216 (or different interfaces) may be designed to enable such policy settings and adaptations by the operating system, applications, and/or users. The ability to set values for control parameters 214 via the settings interface 216, or other comparable functionality, provides a mechanism to tailor management to different situations and achieve different tradeoffs between performance and reliability.

Example Architecture

Figure 3:
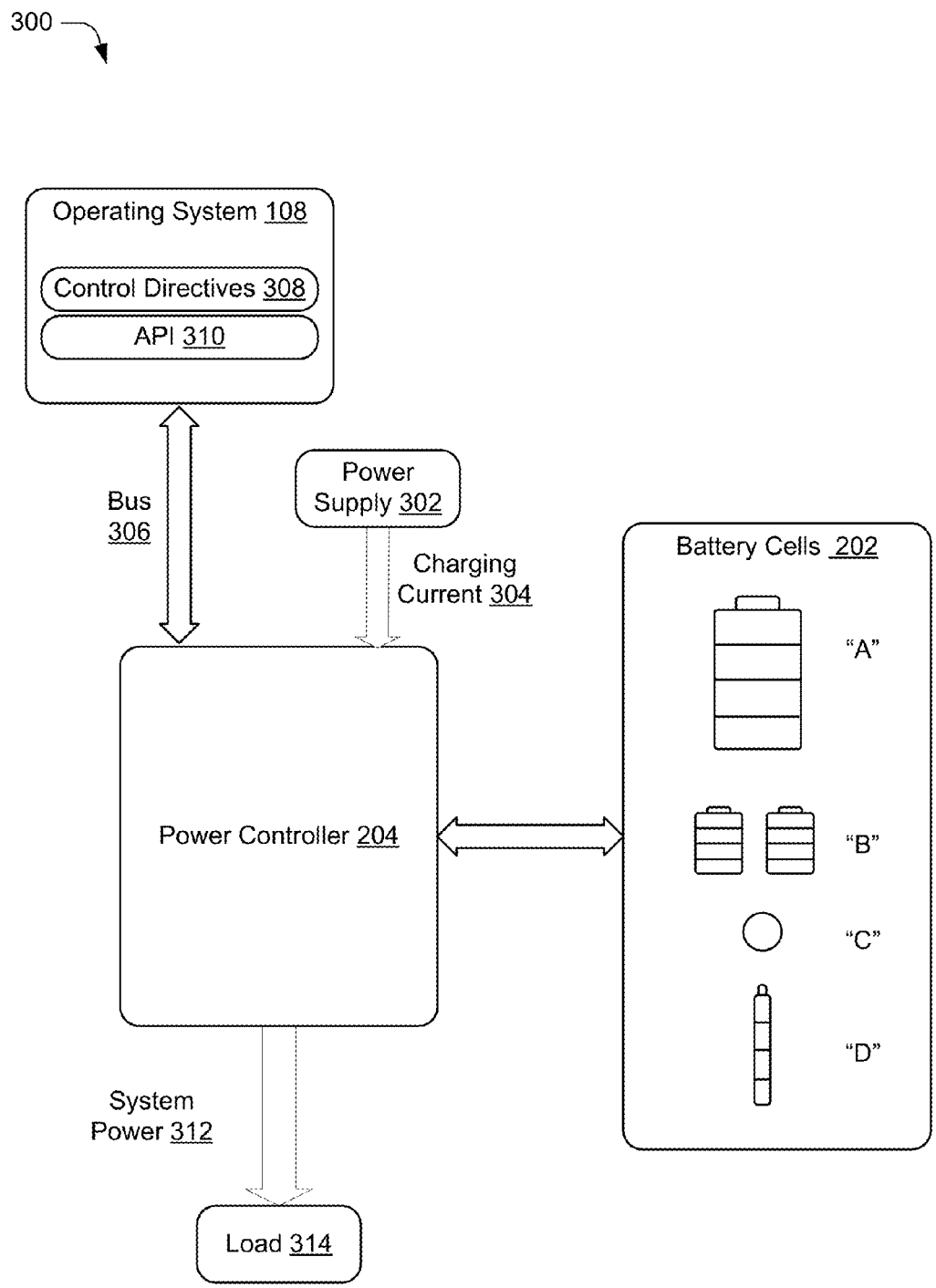
FIG. 3 is diagram depicting an example charging architecture for a battery system in accordance with one or more implementations.

Generally speaking, a battery system 128 having multiple battery cells may be configured in various ways and employ a variety of different types of batteries. In particular, FIG. 3 depicts generally at 300 an illustrative example architecture for a battery system having multiple battery cells 202. The battery cells 202 may be connected in a circuit that includes a power controller 204 as described in relation to the example of FIG. 2. In the depicted example, battery cells 202 include different representative cell groups labeled "A", "B", "C", and "D" each of which may include one or more individual cells. Each of the cell groups is connected directly to the charge controller 204 in a manner that provides individual power paths to and from each of the battery cells/groups for charging and/or discharge.

The architecture may include different battery cells of the same or different types arranged in a circuit that enables selective switching among the battery cells. In the example of FIG. 3, the depicted battery cells 202 are also represented as a collection of battery cells for a battery system that have different characteristics such as different sizes, shapes, state of charge (SOC), capacities, chemistry, and so forth. Using different types of cells provides flexibility for design of the battery system and circuit boards, and consequently enables device developers to make better utilization of internal space to provide devices having increased battery life and efficiency.

The charge controller 204 is depicted as being connected to a power source 302 from which charging current 304 may be obtained to charge the battery cells 202. To perform the charging, the charge controller 204 may implement a control policy 210 that is configured based on factors 212 as previously discussed.

As further represented in FIG. 3, the power controller 204 may be configured to coordinate battery management activity with an operating system 108 via communications exchanged via a bus 306 (e.g., an I²C bus, UART bus, a wireless connection, (WiFi, Bluetooth, etc.) or other suitable communication bus) or other suitable communication channel. In particular, the operating system 108 may include a power manager module 126 or comparable functionally that is operable to direct operation of the power controller 204 in accordance with a control policy 210. In order to do so, the operating system 108 may communicate control directives 308 to the power controller 204 that provides indications regarding settings establish according to the control policy 210. The control directives 308 are configured to dynamically program the power controller 204 to implement different control schemes at different times in accordance with policy decisions made by the operating system 108, via the power manager module 126, or otherwise.

Control directives 308 may be configured as any suitable messages, signals, or communications that are effective to convey information regarding policy decisions and selected strategies to set-up the charge controller 204 accordingly. By way of an example and not limitation, the operating system may expose an application programming interface (API) 310 that may be used by the power manager module 126 and/or other applications to interact with and configure the power controller 204. In one approach, the API 310 may be invoked to communicate control directives 308 that indicate values for control parameters 214 as discussed previously. In any event, the control directives 308 provide a mechanism to access and manipulate functionality provided via the power controller 204 to implement different policy decisions/settings and tailor management of multiple batteries to different scenarios.

Example Circuit.

Figure 4:
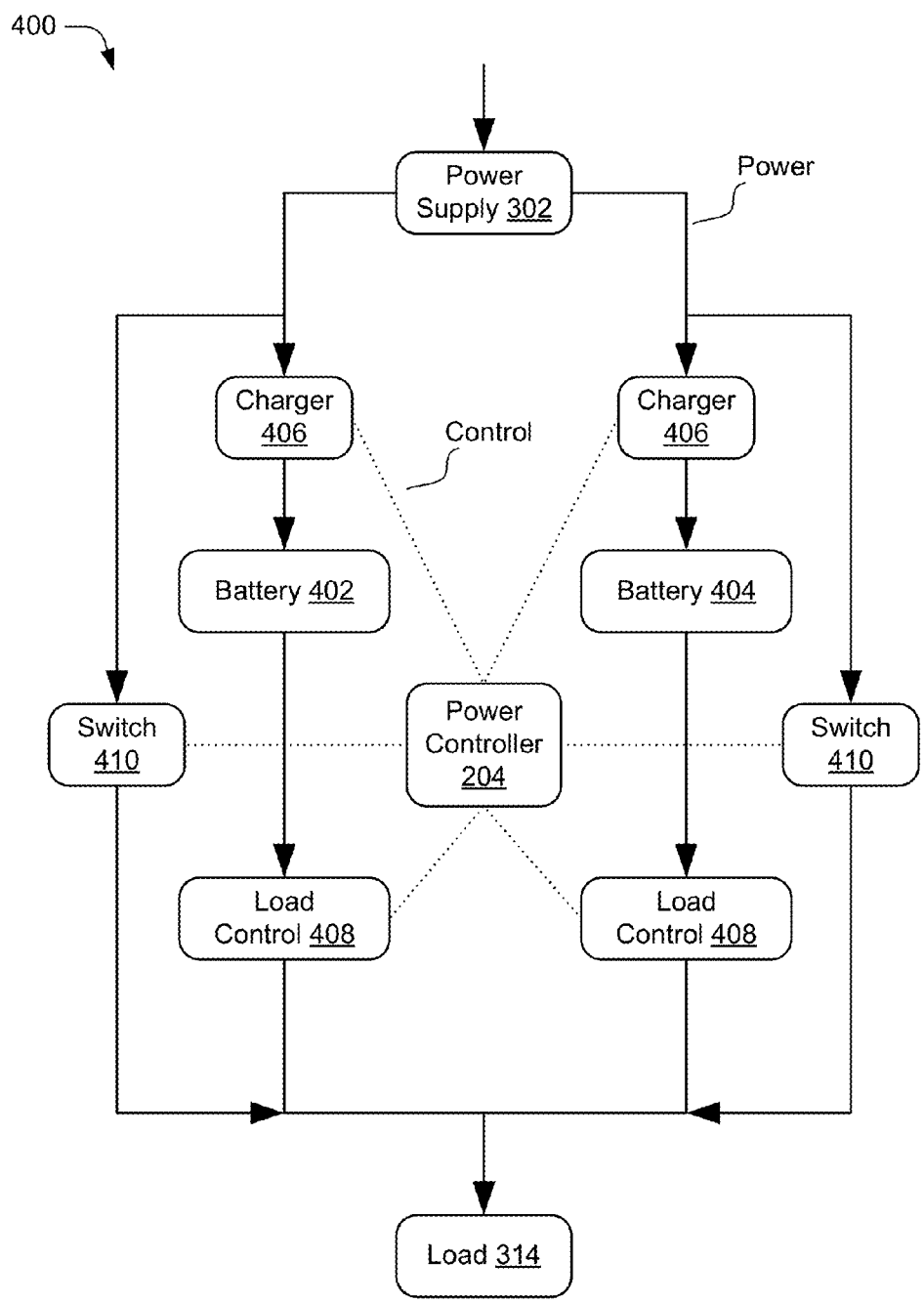
FIG. 4 is diagram depicting an example circuit for a battery system in accordance with one or more implementations.

FIG. 4 depicts generally at 400 an example schematic representation of circuit for control a battery system having multiple battery cells 202 in accordance with techniques described herein By way of example and not limitation, the circuit may represent one arrangement of distribution circuitry 206 of a power controller 204 that is operable via logic 208 of the power controller 204 to manage charging and discharging in accordance with a policy. The schematic representation depicts "power" paths for various components as well as "control" signal connections used to direct operation of the components. Signals to control the components are generated based upon control parameters 214 derived for a control policy 210 as described above and below.

The illustrated example circuit includes a battery 402 and battery 404 representative of a battery system having multiple battery cells. Each of the batteries is connected to a power supply through a charger 406. The chargers 406 represent connections, switches, and logic to supply appropriate current from the power supply for charging of the batteries. A control policy 210 implemented by the controller specifies how current is distributed to the batteries, priority of charging for the batteries, levels of charge, sequences of charging, and other aspects to manage charging. In one approach, a charging parameter specifies a level of charge to achieve for a first, priority battery before charging of other batteries. This may occur to keep a particular battery (e.g., a priority battery to charge preferentially) at a high charge level to support usage scenarios. Charging can also occur in dependence upon cycle counts and a policy to balance the cycles between the batteries over time. Thus, available charge can be manipulated to fit usage scenarios and increase reliability by intelligently controlling charging and charge levels.

Each of the batteries is also connected to a load 314 through a load control 408 element. The load control elements represent a mechanism to selectively service the load by switching between the multiple batteries to use individual batteries, or a combination of two or more batteries at the same time in accordance with a control policy 210. The load control elements also function to isolate the batteries to prevent unintended leakage and discharging of batteries when the system disconnected from the load 314. The load control elements can include switches, diodes, and/or other componentry suitable to control pathways through the distribution circuitry. The control policy 210 implemented by the controller specifies how power from the batteries is utilized, priority of discharging the batteries, charge level constraints for discharge, sequences of discharging, and other aspects to manage discharging. In one approach, a discharging parameter specifies a level of charge to achieve during discharge for a first, priority battery before discharging of other batteries, individually or with multiple batteries servicing the load together. This may occur to keep a particular battery (e.g., a different battery not being discharged) at high charge level to support usage scenarios.

Discharging can also occur in dependence upon cycle counts and a policy to balance the cycles between the batteries over time. Thus, utilization of available battery power can be manipulated to fit usage scenarios and increase reliability by intelligently controlling discharging.

The illustrated example circuit additionally represents switches 410 associated with each of the batteries 402, 404. The switches 410 represent switches that can be operated to connect the power supply 302 directly to the load and/or bypass the batteries when current is available from the power supply 302 to service the load 314. For example, when a device is plugged in, power may be supplied directly to the load rather than using the batteries. It is also possible to charge the batteries at the same time and/or to use a combination of direct supply and battery power to supply the load. Manipulation of the power paths used to supply the load in this manner provide and additional mechanism to control the battery system, adjust charge levels of the batteries, and/or balance charge cycles in accordance with a control policy 210. Further details and examples are discussed in relation to the following example procedures.

Example Procedures

Figure 5:
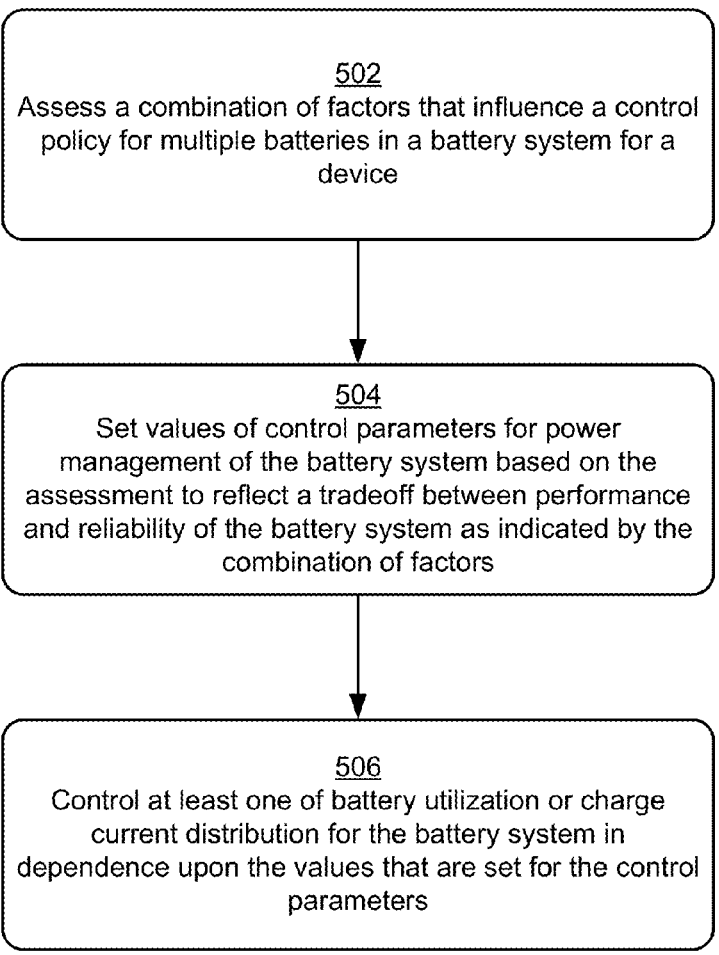
FIG. 5 is a flow diagram that describes details of an example procedure for controlling a battery system having multiple battery cells in accordance with one or more implementations.
Figure 6:
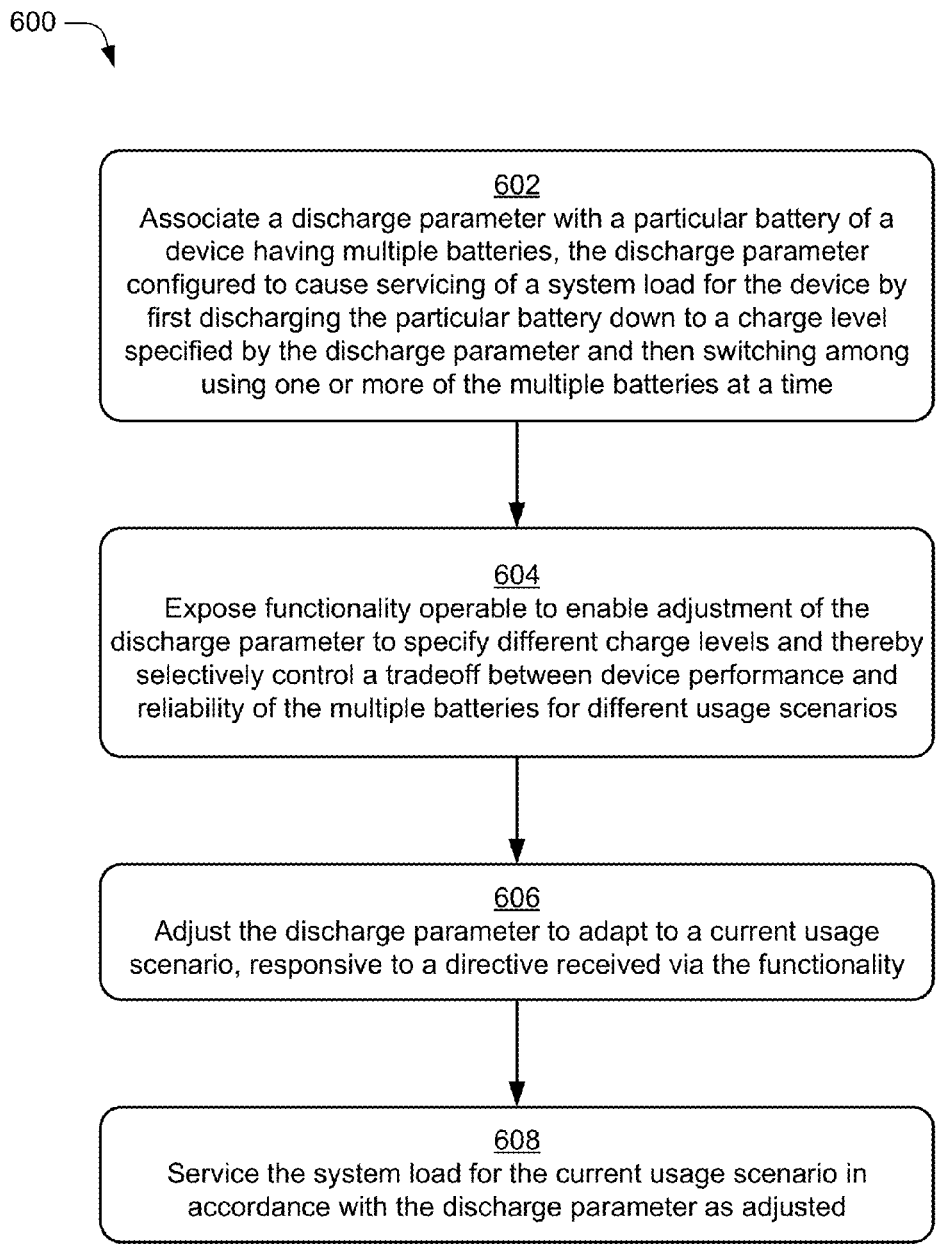
FIG. 6 is a flow diagram that describes details of an example procedure for selectively discharging multiple cells of a battery system in accordance with one or more implementations.
Figure 7:
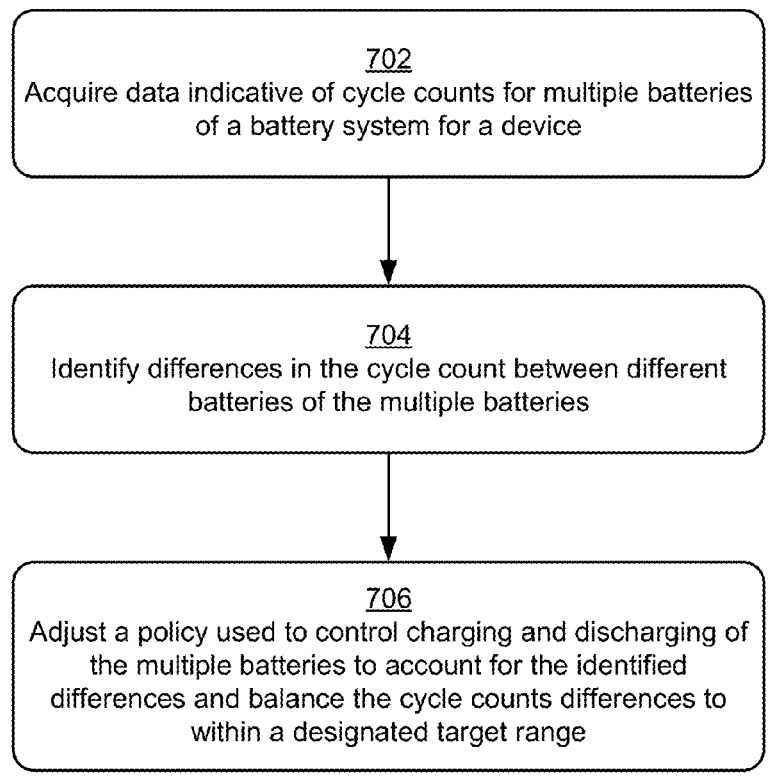
FIG. 7 is a flow diagram that describes details of an example procedure for balancing cycle counts for multiple batteries of a battery system in accordance with one or more implementations.

Further aspects of techniques for battery management for a multiple battery system are discussed in relation to the example procedures of FIGS. 5 to 7. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 5 is a flow diagram that describes details of an example procedure 500 for controlling a battery system having multiple battery cells in accordance with one or more implementations. The procedure 500 can be implemented by way of a suitably configured computing device, such as by way of an operating system 108, power manager module 126, and/or other functionality described in relation to the examples of FIGS. 1-4. Individual operations and details discussed in relation to procedure 500 may also be combined in various ways with operations and details discussed herein in relation to the example procedures of FIG. 6 and FIG. 7 below.

An assessment is made of a combination of factors that influence a control policy for multiple batteries in a battery system for a device (block 502). For example, various factors 212 may be monitored and analyzed to determine a context for a device. Analysis of the factors 212 may occur via a power manager module 126 or comparable functionality implemented via an operating system 108 and/or computing device. It is also contemplated that analysis of factors and other power management functions described herein in relation to power manager module 126 may be implemented via a power controller 204 (e.g., as a part of logic 208). As noted, a variety of factors 212 may be relied upon to inform control decisions. For instance, the factors may include factors indicative of at least cycle counts for the batteries, power requirements to support a current usage scenario, and settings for balancing performance and reliability. Additional factors may relate to characteristics of battery cells 202 of the battery system 128, such as current charge levels, battery types, capacities, priorities established for the batteries, performance factors, and so forth.

Values of control parameters are set for power management of the battery system based on the assessment to reflect a tradeoff between performance and reliability of the battery system as indicated by the combination of factors (block 504). For example, control parameters 214 as discussed previously may be set to adapt a control policy 210 to support different operations and usage scenarios. The control parameters 214 can include at least a charging parameter and a discharging parameter, which are set to specify priorities and charge level constraints for charging and discharging of batteries. Control parameters can also specify a sequence for charging and discharging and indications of when to activate and deactivate different cells for charging/discharging. Thus, multiple batteries can be charged and discharged individually one at a time and/or simultaneously in combinations of two or more batteries in accordance with the control policy 210 and settings for control parameters 214.

At least one of battery utilization or charge current distribution for the battery system is controlled in dependence upon the values that are set for the control parameters (block 506). For example, control directives 308 may be communicated to convey information regarding policy decisions, control parameters, and selected strategies to set-up the power controller 204 as noted previously. The power controller 204 may then selectively activate and deactivate cells as specified by the control policy 210. The control policy 210 specifies constraints via control parameters on a per-cell basis and may be configured to designate different rates, charge levels, times and/or current for different cells for both charging and discharging. The control directives cause the power controller and/or logic thereof to control power paths of distribution circuitry for battery utilization and charge current distribution. This may involve setting switches, diodes, chargers, and other components of a circuit to achieve appropriate power paths. In one or more implementations, batteries of the multiple batteries that are assigned "higher" priority based on the control parameters are discharged or charged to specified charge levels prior to discharging or charging of other batteries of the multiple batteries that have lower "priority". This may occur in dependence upon one or a combination of at least designated charge level percentages or factors, cycle count differences, and constraints established for balancing cycle count differences. Typically, a battery having higher priority is charged first and discharged last, however other priority arrangements are also contemplated.

FIG. 6 is a flow diagram that describes details of an example procedure 600 for selectively discharging multiple cells of a battery system in accordance with one or more implementations. The procedure 600 can be implemented by way of a suitably configured computing device, such as by way of a power manager module 126 and/or other functionality described in relation to the examples of FIG. 1-4. Individual operations and details discussed in relation to procedure 600 may also be combined in various ways with operations and details discussed herein in relation to the example procedure of FIG. 5 above and the example procedure of FIG. 7 below. While the procedure 600 is discussed in terms of discharging/utilization of batteries, comparable techniques may also apply to charging as noted throughout this document.

A discharge parameter is associated with a particular battery of a device having multiple batteries (block 602). The discharge parameter is configured to cause servicing of a system load for the device by first discharging the particular battery down to a charge level specified by the discharge parameter and then switching among using one or more of the multiple batteries at a time to service the load. By way of example, the discharge parameter can specify the charge level as a percentage of full charge of the particular battery to utilize before a switch to using the multiple batteries is made. Once the switch occurs, multiple batteries are available to service the load by using two or more batteries in combination, using a different particular one of the batteries, and/or switching back and forth between multiple batteries. In addition or alternatively, one or more discharge parameters can also specify other constraints examples of which include priorities assigned to different batteries, an order for discharging, time-based constraints, charge level targets, max and min charge levels, and so forth.

The discharge parameter represents one example of a control parameter 214 as discussed herein that enables adjustment of a control policy 210 to adapt the policy to different usage scenarios. In particular, the discharge parameter can be dynamically set and applied to increase reliability by balancing of battery utilization for the multiple batteries over a period of time. The discharge parameter can also be used to preferentially use or maintain available charge for different batteries in different circumstances.

Management and adjustment of a control policy 210 and corresponding control is implemented via a power management control system as discussed herein. In one or more implementations, the control system includes a power manager module 126 implemented as a component of an operating system 108 for the computing device and a power controller 204 including distribution circuitry 206 operable under the influence of the power manager module to selectively charge and discharge the multiple batteries. The control system can be configured to enable continuous adjustments of the battery load via circuitry and/or software. In addition or alternatively, digital adjustments can be made to approximate the continuous approach, such as by using filtered pulse width-modulation (PWM) or a comparable digital control mechanism.

In addition to other components, the distribution circuitry 206 can include load control elements as discussed in relation to FIG. 4 that are associated with circuits for each of the multiple batteries. The load control elements may be directed via the power manager module 126 to selectively connect one or more of the multiple batteries at a time to service the system in accordance with the control policy and the discharge parameter(s).

Functionality is exposed operable to enable adjustment of the discharge parameter to specify different charge levels and thereby selectively control a tradeoff between device performance and reliability of the multiple batteries for different usage scenarios (block 604). For example, a settings interface 216 may be configured in various ways to enable the operating system, applications, power management components, and/or users to adjust parameters for a control policy to implement power management decisions.

In one or more implementations, the functionality to enable adjustment of the discharge parameter comprises an application programming interface (API) exposed for use by applications of the device to set different values of the discharge parameter. For example, the power manager module is configured to adjust the discharge parameter automatically based on an assessment of a combination of factors that influence a charge level policy for the battery system. Various factors and combinations of factors are contemplate including but not limited to one or more current charge levels, reliability constraints, cycle counts, power requirements to support the current usage scenario, or user preferences for balancing performance and reliability.

In addition or alternatively, the functionality operable to enable adjustment of the discharge parameter may include a user interface configured to provide user-selectable control over the discharge parameter. The user interface can be configured in any suitable way using different controls, instrumentalities, and features. For example, the user interface includes at least a suitable instrumentality to set different values for the discharge parameter corresponding to different levels of balance between device performance and reliability. Examples of such an instrumentality include a slider control to select the balance on a scale a input box or list to select different balance values (e.g., 1 to 10 or low to high), a percentage charge level selector, or a selection menu to name a few examples. The user interface can further include instrumentalities to set priorities for different batteries and/or explicitly designate the order of charging and charge level constraints for batteries, collectively or on an individual basis.

It should be noted that the power management system can also be configured to utilize a charging parameter for control of battery charging. Accordingly, the user interface or other settings interface may provide functionality to set the charging parameter in a comparable manner as discussed in relation to the discharge parameter herein and using corresponding controls, instrumentalities, and features. Thus, a charging parameter can be associated with at least one battery of the multiple batteries. The charging parameter is configured to cause preferential charging of the at least one battery. This may occur by charging the at least one battery to a charge level specified by the charging parameter before distributing charging current to other batteries.

Accordingly, interaction may occur via the settings interface 216 or comparable functionality to set control parameters 214 including the discharge parameter. In the context of procedure 600, the discharge parameter is adjusted to adapt to a current usage scenario, responsive to a directive received via the functionality (block 606). Then, the system load for the current usage scenario is serviced in accordance with the discharge parameter as adjusted (block 608).

For example, directives may be generated automatically by applications based on assessments of factors 212 and/or in response to user input obtained via a user interface to select values for different control parameters. In either or both cases, the directives can be processed via a power manger module 126 to cause corresponding changes to the control parameters 214 and thereby adjusts the control policy. The power management system is further configured to communicate control directives to direct operation of the distribution circuitry to discharge the batteries. For example, the power manger module 126 may send control directives 308 via an API 310 to direct operation of the power controller as noted previously. This includes configuring distribution circuitry 206 to implement a particular scheme for discharging of multiple batteries based upon the discharge parameter setting. This can involves discharging one battery to a specified level and then after the specified level is achieve discharging other batteries in combination or on an individual basis to target charge levels for each battery. Doing so provides control over charge cycles to equalize or set a particular balance for battery utilization.

To further illustrate, consider one example usage scenario in which one battery of a two battery system is preferentially kept charged to support the usage scenario. This may be based on battery characteristics such as capacity, type of battery, thermal properties, detected cycle count imbalance between batteries, and so forth. In this case, the second battery may be assigned higher priority for discharge so that it is used first and the first battery discharge thereafter. Similarly, for charging the first battery may be assigned higher priority for discharge so that charging current is distributed first to the first battery, and then to the second battery discharge thereafter. During discharging, if the second battery is completely discharged first before discharging the first battery, the second battery accumulates more cycles and fail first. Additionally, the first battery alone may be unable to provide sufficient power and/or the batteries are discharged proportionally and simultaneously, then some user scenarios may not be satisfied.

To account for this, the discharge parameter can be set to adjust the way in which discharge occurs and strike a balance between performance and reliability. For instance, the discharge parameter can specify a percentage charge level x % (or other controlling value) for the second battery that indicate how much charge of the second battery to consume before discharging the first battery. The value for x % is adjustable as noted herein to adjust the balance and account for different scenarios.

Accordingly to the settings for the percentage charge level, the second battery is discharged first to a certain charge level (e.g., x %) and then the first battery can be discharged. After the specified level is reached, discharge can occur simultaneously for multiple batteries or by switching back and forth between batteries to service the load. In one approach, the discharge is controlled to ensure that both batteries (e.g., multiple batteries of a system) reach a level of 0% at approximately the same time.

Thus, a balance between supporting the user scenario and the reliability of the system depends upon on the value picked for x %. Additionally, the value of x % can be dynamically set to ensure that the battery system provides the device with sufficient power in different usage scenarios. For example, the value of x % can be dynamically adjusted to account for power that is being drawn by the device. Users can also adjust the value to customize battery management and the balance.

The table below represents tradeoffs that can be made in the example usage scenario by varying the value of x %.

| Initially Discharge Battery 2 to X % | Cycle Life Requirement for Battery 2 | Power Available | Battery 1 Kept Charged |
|---|---|---|---|
| 80% | 1134 | 300 W | Lower Priority |
| 20% | 1373 | 160 W | Higher Priority |

As shown in the table above, when x % is higher (80%), then the cycle life requirement for the second battery is lower and the power available is higher. This occurs at expense of keeping the first battery charged, since the first battery is utilized after discharging down to just 80% on the second battery. By comparison, when x % is lower (20%), the cycle life requirement for the second battery goes up and the power available goes down. The benefit here is that the usage scenario/goal of keeping more charge available for the first battery is achieved to a larger extent since the second battery is discharge down to 20% before utilizing the first battery to service the load.

The value of x % and other control parameters 214 can be set based on various factors, which in one or more implementations includes at least cycle counts for the multiple batteries and/or differences between cycle counts. For example, if an imbalance occurs such that the second battery has too many cycles relative to the first battery in the foregoing example, the values of x % and priorities can be adjust to preferentially utilize the first battery until the cycles difference is substantially eliminated (e.g., cycles are equal) or within an acceptable difference range designated for the battery system.

In this context consider FIG. 7, which is a flow diagram that describes details of an example procedure 700 for balancing cycle counts for multiple batteries of a battery system in accordance with one or more implementations. The procedure 600 can be implemented by way of a suitably configured computing device, such as by way of an operating system 108, power manager module 126, and/or other functionality described in relation to the examples of FIGS. 1-4. Individual operations and details discussed in relation to procedure 600 may also be combined in various ways with operations and details discussed herein in relation to the example procedures of FIG. 5 and FIG. 6 above.

Data is acquired that is indicative of cycle counts for multiple batteries of a battery system for a device (block 702). For example, power manager module 126 and/or a power controller 204 may obtain information regarding cycle counts in various ways. In one approach, the data is acquired based upon tracking of the cycle counts for battery charges and discharges. The tracking may occur directly by the power manager module 126 and/or a power controller 204. In addition or alternatively, an operating system of the computing device can perform the tracking and supply data indicative of cycle counts for use by the power manager module 126 and/or a power controller 204 to make power management decisions.

In another approach, the techniques can rely upon cycle count data collected by "smart" batteries, which could employ a gas gauge chip. Thus, one or more batteries of the multiple batteries may be configured to maintain information regarding cycle counts and supply the information to facilitate power management decisions. In this case, acquiring the data can occur through communication with the batteries. For example, the power manager module 126 may query the batteries and/or obtain suitable notifications regarding cycle counts from batteries. The cycle count data may indicate whether one of the batteries is accumulating more cycles and is hence likely to fail first.

Differences in the cycle count between different batteries of the multiple batteries are identified (block 704) and then a policy used to control charging and discharging of the multiple batteries is adjusted to account for the identified differences and balance the cycle counts differences to within a designated target range (block 706). Here, the acquired data is analyzed to compute differences between cycle counts. Depending on the computed differences between the cycle counts, the discharging and charging algorithm can be varied. For example, when a first battery has more cycles than a second battery, the second battery can be preferentially discharged over the first battery during discharges until some defined level of balance in the cycle counts is achieved. Charging approaches for a multiple battery system may be modified based on cycle count differences in a comparable manner. Generally, the techniques discussed herein provide a way to manage cycle counts. Over time, differences in cycle counts can be substantially eliminated (e.g., cycles are equal) and/or managed to fall within an acceptable difference range(s) for cycle count (e.g., cycle count tolerance) designated for the battery system.

Thus, in one or more implementations of the techniques described herein, policy decisions may depend at least in party on cycle counts and/or cycle count differences. In this context, adjustment of a control policy 210 includes setting values of control parameters for power management of the battery system in dependence upon the identified differences in the cycle counts between different batteries. This can include adjusting values for a discharging parameter, a charging parameter, priority parameters, sequence parameters, and/or other control parameters 214.

In one particular example, multiple modes associated with different tiers of differences in the cycle counts are established. For example, a data structure such as a table, database, metadata file, list, or library may be configured to include data that matches different control modes to different values or tiers of differences in cycle counts. In this case, adjusting the policy may involve recognizing a particular mode the matches the differences in the cycle counts that are identified and selecting the particular mode to control the charging and discharging. The settings associated with the selected mode are then utilized to configure the system and manage the batteries accordingly.

The following table represents one illustrative example of a data structure that matches different control modes to different cycle count values or tiers. Naturally, the particular tiers and values for charge level percentages are provided as non-limiting examples and not intended to limit the claimed subject matter. Rather, various different configurations of the data structure, tiers, and values are contemplated.

| Usage | Cycle Count Tier | Discharging Mode |
|---|---|---|
| Heavy user in battery1-only mode | $Cycle_1-Cycle_2 >100$ | Discharge battery 2 to 20% first |
| Heavy user in battery1-only mode | $Cycle_1-Cycle_2 >50$ | Discharge battery 2 to 40% first |
| Default mode | $|Cycle_1-Cycle_2| <50$ | Discharge battery 2 to 70% first |
| Heavy user in battery1 + battery2 mode | $Cycle_2-Cycle_1 >50$ | Discharge battery 2 to 90% first |
| Heavy user in battery1 + battery2 mode | $Cycle_2-Cycle_1 >100$ | Initially discharge battery 1 preferentially to 50% (battery 2 discharges depending on power needed) |

In the example table above, scenarios in which a first battery is heavily used are represented in the first two rows. These scenarios may arise when operations and interactions frequently engaged with a device rely upon usage the first battery and/or restrict availability of a second battery (e.g., other batteries). Another situation is a supplemental battery pack or battery boost that is not always available for the device. The third row in the table represents the default scenario in which the difference in cycle counts for the two batteries are within an acceptable range. Here, the cycles are close to being "balanced" per constraints of the system. The last two rows in the table represents scenarios in which both batteries are available most of the time, and the second battery is set to discharge first such that the second battery accumulates more cycles than the first battery.

As noted, the power management system can track and/or compute cycle count differences and adjust the discharging mode (and charging mode) appropriately. Depending on the magnitude of the difference in cycle count, the percentage x % discussed previously and/or other parameters are modified. In one approach, more aggressive adjustments are made as the magnitude of the difference increases, as reflected by the table. For example, per the example table, when $Cycle_1-Cycle_2>100$ the percentage x % is set to discharge the second battery down to 20% whereas when $Cycle_1-Cycle_2>50$ percentage x % is set to discharge the second battery down to just 40% since the magnitude of the difference is less. In the default or "balanced" condition when $|Cycle_1-Cycle_2|<50$, percentage x % is set to discharge the second battery down to 70% in accordance with default policy settings and/or user selections to specify a tradeoff between reliability and performance. When the second battery accumulates more cycles than the first battery as per the last two rows of the table, the percentage x % is adjusted to account for the higher cycles in the second battery. For example, when $Cycle_2-Cycle_1>50$ percentage x % is set to discharge the second battery down to 90% and then start using the first battery. When $Cycle_2-Cycle_1>100$ percentage x % is set discharge the first battery preferentially down to 50% and use the second battery as needed based on power requirements. Again, the tiers, modes, and particular values/ranges represented by the table above are intended as examples and various other configurations are contemplated.

Having considered the foregoing details and procedures, consider now example system and components associated with one or more implementations of techniques for management of multiple batteries.

Example System

Figure 8:
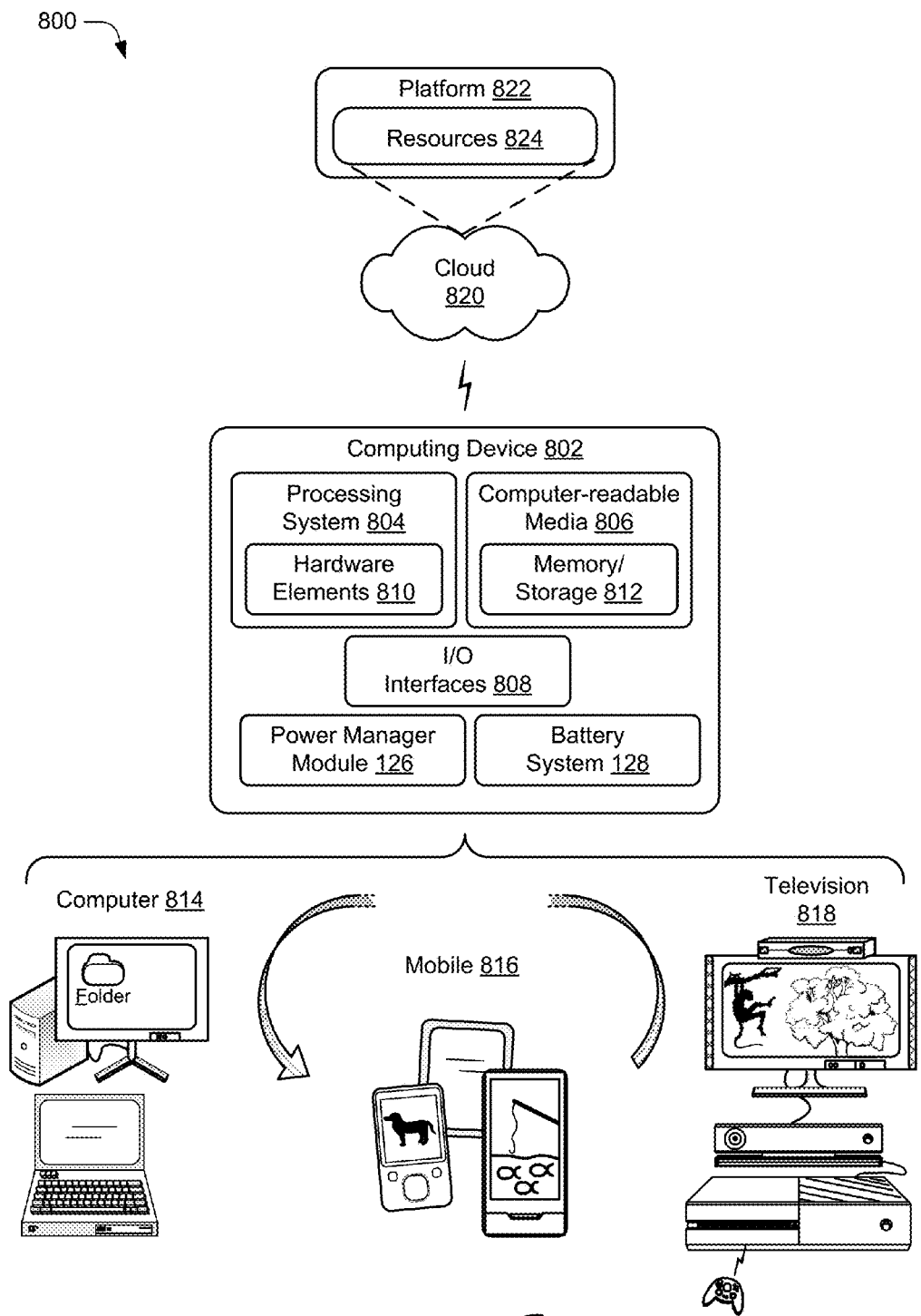
FIG. 8 is a block diagram of a system that can be employed for management of a device having multiple batteries in accordance with one or more implementations.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, a wireless communication bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, power manager module 126, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the power manager module 126 and battery system 128 on the computing device 802. The functionality represented by power manager module 126, battery system 128, and other modules/applications may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

EXAMPLE IMPLEMENTATIONS

Example implementations of techniques described herein include, but are not limited to, one or any combinations of one or more of the following examples:

Example 1

A computing device comprising: a battery system having multiple batteries; a power management system configured to: associate a discharge parameter with a particular battery of the multiple batteries, the discharge parameter configured to cause servicing of a system load for the computing device by: first discharging the particular battery down to a charge level specified by the discharge parameter; and then switching among using one or more of the multiple batteries at a time to service the load; expose functionality operable to enable adjustment of the discharge parameter to specify different charge levels and thereby selectively control a tradeoff between device performance and reliability of the multiple batteries for different usage scenarios; adjust the discharge parameter to adapt to a current usage scenario, responsive to a directive received via the functionality; and service the system load for the current usage scenario in accordance with the discharge parameter as adjusted.

Example 2

The computing device of any one or more of the examples in this section, wherein discharge parameter specifies the charge level as a percentage of full charge of the particular battery to utilize before a switch to using the multiple batteries is made.

Example 3

The computing device of any one or more of the examples in this section, wherein the functionality operable to enable adjustment of the discharge parameter comprises an application programming interface exposed for use by applications of the device to set different values of the discharge parameter.

Example 4

The computing device of any one or more of the examples in this section, wherein the functionality operable to enable adjustment of the discharge parameter comprises a user interface configured to provide user-selectable control over the discharge parameter.

Example 5

The computing device of any one or more of the examples in this section, wherein the user interface provides an instrumentality to set different values for the discharge parameter corresponding to different levels of balance between device performance and reliability Example 6

The computing device of any one or more of the examples in this section, wherein the power management system includes a power manager module implemented as a component of an operating system for the computing device and a power controller including distribution circuitry operable under the influence of the power manager module to selectively charge and discharge the multiple batteries.

Example 7

The computing device of any one or more of the examples in this section, wherein the distribution circuitry comprises load control elements associated with circuits for each of the multiple batteries that are directed via the power manager module to selectively connect one or more of the multiple batteries at a time to service the system load.

Example 8

The computing device of any one or more of the examples in this section, wherein the power management system is further configured to communicate control directives to direct operation of the distribution circuitry to discharge the batteries.

Example 9

The computing device of any one or more of the examples in this section, wherein the power manager module is configured to adjust the discharge parameter automatically based on an assessment of a combination of factors that influence a control policy for the battery system.

Example 10

The computing device of any one or more of the examples in this section 9, wherein the factors that influence the control policy include one or more of: current charge levels, reliability constraints, cycle counts, power requirements to support the current usage scenario, or user preferences for balancing performance and reliability.

Example 11

The computing device of any one or more of the examples in this section, wherein the power management system is further configured to associate a charging parameter with at least one battery of the multiple batteries, the charging parameter configured to cause preferential charging of the at least one battery during charging by charging the at least one battery to a charge level specified by the charging parameter before distributing charging current to other batteries.

Example 12

The computing device of any one or more of the examples in this section, wherein the discharge parameter is applied to increase reliability by balancing of battery utilization for the multiple batteries over a period of time.

Example 13

A method implemented by a computing device comprising: acquiring data indicative of cycle counts for multiple batteries of a battery system for a device; identifying differences in the cycle counts between different batteries of the multiple batteries; and adjusting a policy used to control charging and discharging of the multiple batteries to account for the identified differences and balance the cycle count differences to within a designated target range.

Example 14

The method of any one or more of the examples in this section, wherein adjusting the policy comprises setting values of control parameters for power management of the battery system in dependence upon the identified differences in the cycle counts between different batteries.

Example 15

The method of any one or more of the examples in this section, wherein acquiring the data indicative of cycle counts comprise tracking of the cycle counts for battery charges and discharges via an operating system of the computing device.

Example 16

The method of any one or more of the examples in this section, wherein acquiring the data indicative of cycle counts comprises obtaining notifications regarding cycle counts from batteries of the multiple batteries configured to maintain information regarding cycle counts and supply the information to facilitate power management decisions.

Example 17

The method of any one or more of the examples in this section, further comprising establishing multiple modes associated with different tiers of differences in the cycle counts, wherein adjusting the policy comprises recognizing a particular mode the matches the differences in the cycle counts that are identified and selecting the particular mode to control the charging and discharging.

Example 18

A method implemented by a computing device to manage battery usage of the device for increased battery reliability comprising: assessing a combination of factors that influence a control policy for multiple batteries in a battery system for a device; setting values of control parameters for power management of the battery system based on the assessment to reflect a tradeoff between performance and reliability of the battery system as indicated by the combination of factors; and controlling at least one of battery utilization or charge current distribution for the battery system in dependence upon the values that are set for the control parameters.

Example 19

The method as recited in any one or more of the examples in this section, wherein the combination of factors include at least cycle counts for the batteries, power requirements to support a current usage scenario, and settings for balancing performance and reliability.

Example 20

A method as recited in any one or more of the examples in this section, wherein the controlling comprises communicating directives to a power controller to control power paths of distribution circuitry for battery utilization and charge current distribution, such that batteries of the multiple batteries having priority based on the control parameters are discharged or charged to specified charge levels prior to discharging or charging of other batteries of the multiple batteries that do not have priority.

CONCLUSION

Although techniques and aspects have been described in language specific to structural features and/or methodological acts, it is to be understood that the subject matter defined in the appended claims are not necessarily limited to the specific features or acts described. Rather, the specific features and acts are disclosed as example forms of implementing the claimed subject matter.

What is claimed is:

1. A computing device comprising:
   a battery system comprising:
   multiple batteries including a first battery and a second battery; and
   a power controller; and
   a power manager module configured to:
   determine a current charge cycle count difference between the first battery and the second battery, the current charge cycle count difference reflecting a difference between a first charge cycle count of the first battery and a second charge cycle count of the second battery;
   based at least on the current charge cycle count difference between the first battery and the second battery, determine a particular threshold charge level of the second battery at which to begin discharging the first battery;
   compare a current charge level of the second battery to the particular threshold charge level;
   when the current charge level of the second battery exceeds the particular threshold charge level, cause the power controller to service a system load of the computing device by discharging the second battery without discharging the first battery; and
   after the current charge level of the second battery falls below the particular threshold charge level, cause the power controller to service the system load of the computing device by discharging both the first battery and the second battery.

2. The computing device of claim 1, wherein the power manager module is further configured to:
   access a data table that maps multiple tiers of charge cycle count differences to multiple threshold charge levels of the second battery at which to begin discharging the first battery; and
   select the particular threshold charge level from the data table when the current charge cycle count difference falls within a particular tier of charge cycle count differences in the data table.

3. The computing device of claim 2, wherein the power manager module is further configured to cause the power controller to charge the first battery to a predetermined charge level before charging the second battery.

4. The computing device of claim 2, wherein the data table comprises at least three different tiers of charge cycle count differences and at least three different threshold charge levels of the second battery at which to begin discharging the first battery.

5. The computing device of claim 2, wherein the threshold charge levels in the data table increase numerically as the charge cycle count differences in the data table decrease.

6. The computing device of claim 1, wherein the power manager module is further configured to:
   after the current charge level of the second battery falls below the particular threshold charge level, cause the power controller to service the system load of the computing device by discharging both the first battery and the second battery so that the first battery and the second battery reach a common predetermined charge level at approximately the same time.

7. The computing device of claim 1, wherein the power manager module is further configured to:
   cause the power controller to prioritize the first battery by preferentially keeping the first battery charged relative to the second battery.

8. The computing device of claim 1, wherein the particular threshold charge level is specified as a percentage relative to full charge of the second battery.

9. The computing device of claim 8, wherein the power manager module is further configured to:
   determine the current charge cycle count difference by subtracting the second charge cycle count of the second battery from the first charge cycle count of the first battery.

10. The computing device of claim 1, wherein the second battery is a supplemental battery pack.

11. The computing device of claim 1, further comprising a processor and storage storing instrutions which, when executed by the processor, implement the power manager module.

12. The computing device of claim 1, wherein the power manager module comprises at least one of an application-specific integrated circuit, a field-programmable gate array, or a complex programmable logic device.

13. A method implemented by a computing device, the method comprising:
   acquiring data indicative of cycle counts for multiple batteries of a battery system for the computing device;
   identifying differences in the cycle counts between different batteries of the multiple batteries;
   establishing different tiers of the differences in the cycle counts, the different tiers including a first tier corresponding to the difference in the cycle counts being greater than a first threshold value, a second tier corresponding to the difference in the cycle counts eing greater than a second thershold value and less than the first threshold value, and a third tier corresponding to the difference in the cycle counts being less than the second threshold value;
   adjusting a policy used to control charging and discharging of the multiple batteries to account for the identified differences and balance the differences in the cycle counts to within a designated target range, the adjusting comprising correlating a control mode to one of the different tiers of the differences in the cycle counts, and selcting the conrol mode to control the charging and discharging of the multiple batteries; and
   discharging at least one of the batteries according to the selected control mode.

14. The method of claim 13, wherein adjusting the policy comprises setting values of control paramters for power management of the battery system in dependence upon the identified differences in the cycle counts between the different batteries of the multiple batteries.

15. The method of claim 13, wherein acquiring the data indicative of the cycle counts comprises tracking the cycle counts for baterry charges and discharges via an operating system of the computing device.

16. The method of claim 13, wherein acquiring the data indicative of the cycle counts comprises obtaining notifications regarding the cycle counts from batteries of the multiple batteries configured to maintain information regarding the cycle counts and supply the information to facilitate power management decisions.

17. The method of claim 13, wherein adjusting the policy comprises specifying a priority for each of the multiple batteries based at least on the differences in the cycle counts.

18. A method performed by a computing device, the method comprising:
   determining a current charge cycle count difference between a first battery and a second battery, the current charge cycle count difference reflecting a difference between a number of charge cycles of the first battery and a number of charge cycles of the second battery;

based at least on the current charge cycle count difference between the first battery and the second battery, determining a particular threshold charge level of the second battery at which to begin discharging the first battery;

comparing a current charge level of the second battery to the particular threshold charge level;

when the current charge level of the second battery exceeds the particular threshold charge level, servicing a load by discharging the second battery without discharging the first battery; and after the current charge level of the second battery falls below the particular threshold charge level, servicing the load by discharging both the first battery and the second battery.

19. The method of claim 18, wherein the load is a system load of the computing device.

20. The method of claim 18, further comprising:

storing a data structure that maps multiple tiers of charge cycle count differences to multiple threshold charge levels at which to begin discharging the first battery; and selecting the particular threshold charge level from the data structure when the current charge cycle difference falls within a particular tier of cycle count differences in the data structure.

* * * * *